_United States Patent Office_ 3,512,925
Patented May 19, 1970

3,512,925
SELECTIVE REMOVAL OF NITROGEN DIOXIDE AND/OR OXYGEN FROM GAS MIXTURES CONTAINING NITRIC OXIDE
Guenter Buechler, Heidelberg, Heinz Engelbach, Limburgerhof, Pfalz, and Heinz Theobald, Ludwigshafen (Rhine), Germany, assignors to Badische Anilin- & Soda-Fabrik Aktiengesellschaft, Ludwigshafen (Rhine), Germany
No Drawing. Filed July 12, 1967, Ser. No. 652,737
Claims priority, application Germany, July 21, 1966, 1,542,628; May 5, 1967, 1,667,387
Int. Cl. B01d 53/00; C01b 21/20
U.S. Cl. 23—2
8 Claims

ABSTRACT OF THE DISCLOSURE

Process for selectively removing at least one of oxygen and nitrogen dioxide as impurities from nitric oxide comprising contacting a gas consisting essentially of nitric oxide and at least one of said impurities in admixture with hydrogen with a catalyst containing oxidic compound of silver, and which optionally additionally may contain iron oxide and/or manganese oxide, at a temperature from about 100° C. to about 700° C.

---

The present invention relates to a process for the selective removal of nitrogen dioxide and/or oxygen from gases containing nitric oxide, such as are obtained for example in the catalytic combustion of ammonia, by catalytic reduction with hydrogen.

Pure nitric oxide is required to an increasing extent for many industrial purposes, e.g. for the production of hydroxylamine. High purity requirements are placed on this nitric oxide.

It is known that nitric oxide may be obtained by catalytic combustion of ammonia with oxygen or oxygen-containing gases, if desired diluted with steam, the reaction being carried out while maintaining specific reaction conditions so that a minimum of other oxides of nitrogen is formed.

To obtain a high-percentage nitric oxide and a good combustion yield at the catalyst, a volumetric ratio of $NH_3:O_2$ of 1:1.28 to 1:1.40 is maintained in the mixture supplied to the combustion chamber, while according to the equation:

$$4NH_3 + 5O_2 \rightleftharpoons 4NO + 6H_2O$$

a ratio of only 1:1.25 should be required to obtain the NO primarily formed.

More than 80% of the $NH_3$-nitrogen introduced may be recovered in the form of highly concentrated nitric oxide gas.

On cooling of the reaction gases the excess oxygen reacts, when the residence time is adequate, with part of the nitric oxide to form nitrogen dioxide. The nitrogen dioxide is then deposited with the water vapor by condensation as dilute nitric acid. By aftertreating the reaction gas with alkaline reagents, a gas containing at least 95% by volume of NO is obtained. The gas contains as impurities: about 4.5% by volume of nitrogen and about 0.5% of nitrous oxide ($N_2O$), which are formed in a secondary reaction of oxygen with ammonia at the platinum catalyst. The yield of nitric oxide is decreased by the nitric acid formed in the condensation. This is particularly a disadvantage when the nitric acid cannot be utilized.

It is known that, in order to lessen the loss of nitric oxide, nitrogen dioxide and molecular oxygen contained in the gas can be reduced by admixture of a fuel in the presence of a catalyst. In this way nitrogen dioxide is converted to nitric oxide according to the equation:

$$H_2 + NO_2 \rightleftharpoons NO + H_2O$$

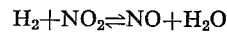

and oxygen is converted to water. To a lesser degree, nitric oxide may also react with the fuel, especially if this is added in an amount in excess of that required to combine with the nitrogen dioxide and the oxygen, according to the equations:

$$H_2 + NO \rightleftharpoons \tfrac{1}{2}N_2 + H_2O$$
$$H_2 + 2NO \rightleftharpoons N_2O + H_2O$$

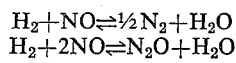

to form nitrogen and nitrous oxide.

Examples of fuels are hydrogen, carbon monoxide, methane, natural gas and other hydrocarbon gases. Metals of the platinum group are used as catalysts and the temperature is adjusted so that it lies above the lowest ignition temperature of the mixture.

When employing hydrogen, which has a lower ignition temperature than other fuels, as the reducing agent, nitrogen dioxide is removed to the extent of only 60 to 70% when using amounts of hydrogen which are equivalent to those required for conversion of the nitrogen dioxide and combination with the oxygen. Larger amounts can be removed by using more hydrogen, but this involves the disadvantage that an appreciable part of the nitric oxide is attacked in accordance with the equations given above. Apart from the fact that the yield of nitric oxide is thus decreased, the nitrous oxide formed and contained in the nitric oxide may cause difficulties in the further processing of the nitric oxide. The formation of nitrogen also constitutes a disadvantage because the desired nitric oxide is diluted by it and the removal of nitrogen from this gas mixture is practically impossible.

The present invention has for its object to carry out the reduction of nitrogen dioxide and of oxygen in gas mixtures containing nitric oxide with hydrogen as reducing gas so that while the two first-mentioned gases are removed to a large extent, the nitric oxide is practically not attacked.

We have found that nitrogen dioxide and/or molecular oxygen can be removed with high selectivity from gas mixtures containing nitric oxide by catalytic reduction with hydrogen, by using as the catalyst one which contains as the active component silver and, if desired, manganese, particularly in the form of their oxidic compounds.

It is possible by means of the catalysts according to this invention to remove the two gases (nitrogen dioxide and oxygen) to the extent of about 92% from gases containing nitric oxide, even when a stoichiometric amount of hydrogen is used. When the amount of hydrogen is increased to an amount which is about 10% above the stoichiometric amount, oxygen and nitrogen dioxide can be removed to the extent of more than 98% of their original amount from the gas without the nitric oxide being substantially attacked.

As compared with other reducing gases, e.g. hydrocarbons, hydrogen has the advantage that there is no formation of carbon dioxide or carbon monoxide by which the desired nitric oxide would be contaminated.

The catalysts used according to this invention contain as active component silver, or silver and manganese, for example in the form of their oxidic compounds. They may be used alone or in combination with a suitable carrier material, for example aluminum oxide, silicon dioxide or diatomaceous earth. The active components may be applied to the carrier material in conventional manner, for example by impregnation with appropriate salt solutions. It is also possible however to knead the finely powdered carrier substance with a silver salt solution and, if desired, a manganese salt solution and to make the mixture into pellets which are then dried, advantageously at temperatures equivalent to their operating temperatures, and then calcined. The amount of silver to be applied to the carrier depends on the composition of the gas and particularly on its content of nitrogen dioxide. When the content of nitrogen dioxide is high, for example 10%, a low content of silver, for example 0.5% by weight (calculated as $Ag_2O$ and based on the whole catalyst), is adequate. When the content of nitrogen dioxide is low it is advantageous to use supported catalysts having a higher content, i.e. up to 15% by weight of silver, for example 5 to 15% by weight (calculated as $Ag_2O$ and based on the whole catalyst). The activity of the catalyst and its mechanical properties are improved by adding manganese which is mainly present in oxidic form in the catalyst. The manganese may constitute a substantial component of the catalyst and, calculated as manganese (IV) oxide, may amount to up to about 70% by weight of the whole catalyst. The catalyst advantageously contains about 10 to 30% by weight of manganese (IV) oxide.

In accordance with another feature of the invention it is also possible for the catalyst to contain iron, particularly in the form of its oxidic compounds, in addition to silver or in addition to silver and manganese.

The result of the addition of iron, iron (III) oxide being particularly suitable, is that in the reductive treatment of gas mixtures containing nitric oxide the secondary reactions by which nitric oxide is reduced to nitrous oxide are suppressed to an appreciable extent. At the same time an improvement is achieved in the removal of nitrogen dioxide and oxygen. In general it is advantageous to add to the catalyst 5 to 30% by weight of $Fe_2O_3$ based on the weight of the whole catalyst.

If the catalysts are used as supported catalysts, it is possible, as described above, to prepare them by impregnating the carrier with the appropriate iron salts which are converted into oxidic iron compounds by subsequent calcination. The iron oxide may also be added as such to the carrier substance, mixed therewith and the mixture then mixed with the other active components.

The throughput to be maintained in the process may be varied within wide limits and depends mainly on the composition of the gas. It may be from 10,000 to 200,000 parts by volume of gas per part by volume of catalyst per hour. The temperature for the reaction may be from 100° to 700° C., especially from 100 to 600° C. The process is normally carried out at atmospheric pressure but may also be carried out at superatmospheric pressure.

The gases to be treated according to this invention may contain inert gases, for example nitrogen, in addition to nitric oxide and the nitrogen dioxide and/or oxygen to be removed. The gases may be dry or may contain considerable amounts of water vapor. The content of nitrogen dioxide in the gas mixture may be up to 10% by volume and the content of oxygen may be up to 5% by volume.

The invention is illustrated by the following examples.

EXAMPLE 1

40 ml. of a catalyst prepared by mixing 15 g. of silver oxide (prepared by precipitation of a silver nitrate solution with caustic soda solution), 126 g. of manganese (IV) oxide (prepared by thermal decomposition of manganese (II) nitrate $Mn(NO_3)_2 \cdot 6H_2O$) and 53 g. of gamma-aluminum oxide) is placed in a porcelain tube having a diameter of 27 mm. The catalyst contains about 7.5% by weight of silver oxide ($Ag_2O$), 65% by weight of manganese oxide ($MnO_2$) and 27.5% by weight of gamma-aluminum oxide.

A gas having the following composition:

| | Percent by volume |
|---|---|
| NO | 11.0 |
| $NO_2$ | 2.75 |
| $N_2O$ | 0.12 |
| $N_2$ | Remainder | is passed through the porcelain tube. The gas is passed through the tube at the rate of 25,000 parts by volume (referred to 0° C. and atmospheric pressure) per part by volume of catalyst per hour.

Prior to entry into the tube, 2.8% by volume of hydrogen is mixed with the gas. The temperature at which the gas enters is 220° C. and the temperature of the bed of catalyst rises during the reaction to 370° C.

The gas has the following composition after leaving the tube:

| | Percent by volume |
|---|---|
| NO | 13.5 |
| $NO_2$ | 0.084 |
| $N_2O$ | 0.17 |
| $N_2$ | Remainder |

This means that about 97% of the nitrogen dioxide present in the original gas has been removed. Total loss of nitrogen oxides as a result of secondary reactions of nitric oxide or nitrogen dioxide with hydrogen to form nitrogen or nitrous oxide is only 1.2%.

EXAMPLE 2

Manganese (IV) oxide ($MnO_2$) and silver oxide ($Ag_2O$) (prepared by common thermal decomposition of 297 g. of manganese (II) nitrate ($Mn(NO_3)_2 \cdot 6H_2O$) and 5.9 g. of silver nitrate) are mixed in a kneader for two to three hours with 424 g. of gamma-aluminum oxide and 480 ml. of water. The mixture is then dried and calcined for about two hours at 600° C.

In the manner described in Example 1, a current of gas is passed through a stainless steel tube containing 60 ml. of the said catalyst which consists of about 1% by weight of silver oxide, 20% by weight of manganese oxide ($MnO_2$) and 79% by weight of gamma-aluminum oxide. The gas is supplied at a rate of 20,000 parts by volume (referred to 0° C. and atmospheric pressure) per part by volume of catalyst per hour. The gas has the following composition:

| | Percent by volume |
|---|---|
| NO | 29.8 |
| $NO_2$ | 9.1 |
| $N_2O$ | 0.29 |
| $N_2$ | Remainder |

9.5% by volume of hydrogen is mixed with this gas prior to its entry into the reaction tube.

The gas inlet temperature is 220° C. and the temperature of the catalyst bed rises to about 600° C. The gas has the following composition after leaving the reactor:

| | Percent by volume |
|---|---|
| NO | 37.8 |
| $NO_2$ | 0.09 |
| $N_2O$ | 0.38 |
| $N_2$ | Remainder |

It will be seen from this that about 99% of the nitrogen dioxide originally present in the gas has been converted into nitric oxide.

EXAMPLE 3

437 g. of manganese (II) nitrate ($Mn(NO_3)_2 \cdot 6H_2O$) is melted by slight heating and then a solution of 29.3 g. of silver nitrate in 50 to 70 ml. of water is added to the melt. 330 g. of gamma-aluminum oxide is impregnated with the said solution and the mixture kneaded for one to two hours and then made into pellets having a diameter of 4 mm.

The pellets are dried for two hours at 140° C. and then treated for another two hours in a muffle furnace at a temperature of 200° to 250° C., so that the silver salt and the manganese salt are converted into their oxides. The pellets are calcined for another two hours at temperatures of from 500° to 600° C.

The finished catalyst contains about 4% by weight of silver oxide, 30% by weight of manganese oxide ($MnO_2$) and 66% by weight of gamma-aluminum oxide.

Measured amounts of nitric oxide, oxygen, nitrogen and hydrogen are mixed, heated to 230° to 250° C. and passed through a stainless steel tube whose interior diameter is 20 mm. The tube is located in a salt bath.

The gas introduced into the tube has the following composition:

|   | Percent by volume |
|---|---|
| NO | 32.8–34.6 |
| $NO_2$ | 5.4–5.6 |
| $N_2O$ | 0.12–0.18 |
| $N_2$ | Remainder |

5.1 to 5.9% by volume of hydrogen is mixed with the said gas before it enters the tube. The following table gives the results of experiments in dependence on the space velocity (parts by volume of gas per part of catalyst per hour) used.

EXAMPLE 5

A gas having the following composition:

|   | Percent by volume |
|---|---|
| NO | 33.8 |
| $NO_2$ | 6.1 |
| Water vapor | 58.5 |
| $N_2$ | Remainder | is heated to 200° to 220° C., 6.5% by volume of hydrogen is mixed with it and the whole is passed into a reaction tube having a diameter of 34 mm. which contains 150 ml. of a catalyst which has been prepared as described in Example 3 and consists of about 4% by weight of silver oxide, 30% by weight of manganese oxide ($MnO_2$) and 66% by weight of gamma-aluminum oxide. The gas is passed through the tube at a velocity of 20,000 parts by volume (referred to 0° C. and atmospheric pressure) per hour per part by volume of catalyst. The temperature in the catalyst bed rises to 550° C. during the reaction.

TABLE 1

| Space volocity (h⁻¹) | Temperature at tube inlet (° C.) | Temperature peak in catalyst (° C.) | Amount of $H_2$ (factor ¹) | Removal of $NO_2$ (percent) | Increase of $N_2O$ over amount originally present (factor) |
|---|---|---|---|---|---|
| 22,000 | 230–250 | 457 | 0.95 | 88 | 1.3 |
| 22,000 | 230–250 | 491 | 1.0 | 92 | 1.1 |
| 22,000 | 230–250 | 505 | 1.05 | 95 | 1.0 |
| 44,000 | 230–250 | 498 | 1.0 | 90.7 | 1.4 |
| 44,000 | 230–250 | 515 | 1.05 | 94.3 | 1.3 |
| 88,000 | 230–250 | 480 | 1.0 | 87.6 | 1.6 |
| 88,000 | 230–250 | 492 | 1.05 | 91 | 1.65 |
| 88,000 | 230–250 | 510 | 1.1 | 94.1 | 1.5 |
| 122,000 | 230–250 | 477 | 1.0 | 85 | 1.25 |
| 122,000 | 230–250 | 489 | 1.05 | 89 | 1.6 |
| 122,000 | 230–250 | 510 | 1.1 | 91.3 | 1.6 |

¹ $H_2$-factor: 1.0 denotes the amount of $H_2$ required to convert $NO_2$ into NO.

EXAMPLE 4

Catalysts of different composition are prepared by the method described in Example 3 and their activity is demonstrated by the following series of experiments.

The gas entering the reaction vessel has the following composition:

|   | Percent by volume |
|---|---|
| NO | 31.7–33.7 |
| $NO_2$ | 5.2–5.4 |
| $N_2O$ | 0.12–0.21 |
| $N_2$ | Remainder |

4.9 to 5.9% by volume of hydrogen is mixed with this gas before it enters the vessel. The space velocity is 22,000 parts by volume of gas per part by volume of catalyst per hour. The gas has a temperature of about 250° C. when it enters the vessel. The results obtained with catalysts of different composition are given in the following Table 2.

After the water vapor has been condensed, the gas has the following composition:

|   | Percent by volume |
|---|---|
| NO | 94.0 |
| $N_2O$ | 0.3 |
| $N_2$ | 5.7 |

The nitrogen dioxide has been converted into NO to the extent of about 96%.

EXAMPLE 6

A gas such as is obtained in industrial combustion of ammonia with oxygen and which has the following composition:

|   | Percent by volume |
|---|---|
| NO | About 13. |
| $O_2$ | About 0.8. |
| $NO_2$ | About 0.4. |
| $N_2O$ | About 0.06–0.08. |
| Water vapor | Remainder. |

TABLE 2

| Temperature peak at catalyst (° C.) | Catalyst composition Wt. percent $Ag_2O$ | Wt. percent $MnO_2$ | Wt. percent $Al_2O_3$ | Amount of $H_2$ (factor) | Removal of $NO_2$ (percent) | Increase in $N_2O$ over the amount originally present (factor) |
|---|---|---|---|---|---|---|
| 478 | 4 | 0 | 96 | 0.95 | 83 | 1.9 |
| 486 | 4 | 0 | 96 | 1.0 | 88 | 2.3 |
| 508 | 4 | 0 | 96 | 1.05 | 93 | 2.4 |
| 515 | 4 | 5 | 91 | 0.95 | 88 | 0.7 |
| 535 | 4 | 5 | 91 | 1.0 | 92 | 0.7 |
| 550 | 4 | 5 | 91 | 1.05 | 95.2 | 0.7 |
| 568 | 4 | 5 | 91 | 1.1 | 98.1 | 0.6 |
| 492 | 4 | 10 | 86 | 0.95 | 84 | 0.9 |
| 510 | 4 | 10 | 86 | 1.0 | 89 | 0.8 |
| 529 | 4 | 10 | 86 | 1.05 | 93 | 0.8 |
| 548 | 4 | 10 | 86 | 1.1 | 96.5 | 0.6 |
| 510 | 4 | 30 | 66 | 0.95 | 88 | 0.94 |
| 528 | 4 | 30 | 66 | 1.0 | 92 | 1.06 |
| 542 | 4 | 30 | 66 | 1.05 | 95 | 1.06 |
| 561 | 4 | 30 | 66 | 1.1 | 98 | 1.06 | is mixed with about 2% by volume of hydrogen and the gas mixture is heated to a temperature of 250° C. The heated gas mixture is introduced into a reaction tube whose diameter is 34 mm. The reaction tube contains 150 ml. of a catalyst which has been prepared as described in Example 3 and which consists of about 6% by weight of silver oxide, 5% by weight of manganese oxide ($MnO_2$) and 89% by weight of gamma-aluminum oxide. The gas is passed through the tube at a velocity of 20,000 parts by volume, referred to 0° C. and atmospheric pressure) per hour per part by volume of catalyst. The temperature in the catalyst layer rises to 380° C.

After the water vapor contained in the gas has been condensed, the gas has the following composition:

| | Percent by volume |
|---|---|
| NO | 94–95 |
| $N_2O$ | 0.5–0.7 |
| $N_2$ | Remainder |

The oxygen has been removed from the gas mixture to the extent of about 95% and the $NO_2$ has been reduced to NO.

EXAMPLE 7

Aluminum oxide, with or without iron oxide, is finely powdered in a ball mill. A concentrated solution of silver nitrate, with or without manganese nitrate $$(Mn(NO_3)_2 \cdot 6H_2O)$$

is added to it in a kneader and the whole is mixed for about two hours. The mixture thus obtained is pelletized, dried and calcined at temperatures of 300° to 400° C. The compositions of the catalysts thus obtained may be seen from the following Table 3.

In each case 50 ml. of the catalyst obtained is introduced into a stainless steel tube having a length of 700 mm. and an internal diameter of 20 mm. 1,000 liters/h. of gas preheated to 300° C. is passed through the tube, which corresponds to a space velocity of 20,000 parts by volume of gas (referred to 0° C. and atmospheric pressure) per hour per part by volume of catalyst. The gas mixture has the following composition:

| | Percent by volume |
|---|---|
| NO | 11.0–11.5 |
| $NO_2$ | 2.0–2.4 |
| $N_2O$ | 0.06–0.08 |
| $N_2$ | Remainder |

Depending on the composition of the catalyst in each case, the degrees of $NO_2$ or $O_2$ removal in percent (R%) are given in the following Table 3, in which TE=temperature ° C. at entry into the catalyst, PT=peak temperature ° C. in catalyst, $H_2$=hydrogen supply, given as a factor, 1.0 denoting the amount of hydrogen required stoichiometrically for conversion of the $NO_2$ into NO, and Inc.=increase in the amount of $N_2O$ over the amount originally present, given as a factor, 1.0 denoting that the $N_2O$ content of the gas has not changed after the catalytic treatment.

TABLE 3

| Composition of catalyst, percent by weight | | | | TE | PT | $H_2$ | R% | Inc. |
|---|---|---|---|---|---|---|---|---|
| $Ag_2O$ | $MnO_2$ | $Fe_2O_3$ | $Al_2O_3$ | | | | | |
| 4 | | | + | 300 | 395 | 1.0 | 93 | 2.0 |
| 4 | 5 | | + | 300 | 395 | 1.0 | 93 | 1.6 |
| 4 | | 30 | + | 300 | 392 | 1.0 | 96 | 1.1 |
| 4 | | 5 | + | 300 | 395 | 1.0 | 95 | 1.1 |
| 4 | | 20 | + | 300 | 395 | 1.0 | 95 | 1.1 |
| 4 | | 30 | + | 300 | 395 | 1.1 | 99 | 1.0 |

+ Remainder.

It will be seen from this table that catalysts which contain iron (III) oxide have a higher activity than those free from iron (III) oxide.

We claim:

1. A process for the selective removal of nitrogen dioxide and oxygen as impurities from a gaseous mixture consisting essentially of nitric oxide and at least one of said impurities, which process comprises: contacting said gaseous mixture in admixture with hydrogen at a temperature of about 100° C. to 700° C. with a catalyst containing as an active component an oxidic compound of silver, the amount of hydrogen present in said gaseous mixture being at least stoichiometrically equivalent to the total content of the oxygen and nitrogen dioxide impurities.

2. A process as claimed in claim 1 wherein at least part of the oxidic silver of said catalyst has been reduced to metallic silver.

3. A process as claimed in claim 1 wherein said catalyst contains silver, calculated as $Ag_2O$, in an amount of up to 15% by weight based on the whole catalyst.

4. A process as claimed in claim 1 wherein said catalyst also contains at least one oxidic compound of a metal selected from the group consisting of manganese and iron.

5. A process as claimed in claim 4 wherein the oxidic compound of manganese, calcuated as $MnO_2$, is present in an amount of up to 70% by weight based on the whole catalyst and the oxidic compound of iron, calculated as $Fe_2O_3$, is present in an amount of up to 30% by weight based on the whole catalyst.

6. A process as claimed in claim 1 wherein the active component is supported on a carrier material.

7. A process as claimed in claim 6 wherein said carrier material is at least one substance selected from the group consisting of aluminum oxide, silicon dioxide and diatomaceous earth.

8. A process as claimed in claim 1 wherein the amount of hydrogen in said gaseous mixture is from about the stoichiometric amount to about 10% above the stoichiometric amount with reference to said impurities.

References Cited

UNITED STATES PATENTS 3,098,712   7/1963   Andersen et al. _____ 23—159

EARL C. THOMAS, Primary Examiner

U.S. Cl. X.R.

23—159, 161